United States Patent
Moore

[15] 3,669,406
[45] June 13, 1972

[54] BALL VALVE

[72] Inventor: Howard V. Moore, Long Beach, Calif.
[73] Assignee: Pacific Valves, Inc., Long Beach, Calif.
[22] Filed: Feb. 10, 1971
[21] Appl. No.: 114,195

[52] U.S. Cl..............................................251/315, 251/317
[51] Int. Cl.....................................................F16k 5/06
[58] Field of Search..................137/539; 251/170, 174, 314, 251/315, 316, 317

[56] References Cited

UNITED STATES PATENTS

| 2,297,161 | 9/1942 | Newton | 251/317 UX |
| 3,411,746 | 11/1968 | Scaramucci | 251/315 |
| 3,483,888 | 12/1969 | Wurzel | 137/539 |
| 3,522,930 | 8/1970 | Richards | 251/315 |
| 3,554,485 | 1/1971 | Richards | 251/174 X |

Primary Examiner—Harold W. Weakley
Attorney—George J. Netter and Kendrick, Subkow & Kriegel

[57] ABSTRACT

The rotary ball valve includes a generally annular seal which is held in place by an edge anchored annular retainer. The retainer is oversized for the valve housing and on installation resides in a state of compression.

9 Claims, 3 Drawing Figures

INVENTOR
HOWARD V. MOORE
BY KENDRICK, SUBKOW
and KRIEGEL
George J. Netter
ATTORNEYS 3,669,406

BALL VALVE

The present invention relates generally to ball valves, and, more particularly, to a seal retainer for such valves.

BACKGROUND OF THE INVENTION

So-called ball valves, or rotary ball valves, require an efficient seal to prevent fluid leakage therepast when adjusted to the closed or off position. In the past, such valve constructions have included a sealing member and a retainer which holds the sealing member against the valve ball and adjacent valve walls, where the seal retainer was conventionally either threaded, bolted or snap-ringed within the valve structure. Such construction is relatively complex and is a substantial factor of manufacturing and assembly costs.

In a further known ball valve the ball seal is backed by a retainer plate which, in turn, is backed by a snap ring. Not only does the increased number of parts add to the cost of the valve, but sealing of the retainer under pressure is not completely satisfactory and there are additional areas subject to possible crevice corrosion. Additionally, there is the possibility of the snap ring working out of its retaining groove due to vibration or repeated shock loading.

OBJECTS AND SUMMARY OF THE INVENTION

It is, therefore, a primary object and aim of this invention to provide a ball valve seal retainer that is quickly and easily inserted in operative position within the valve and does not rely on threaded, bolted or snap ring securement.

A further object is the provision of a seal retainer which automatically adjusts to compensate for seal wear.

Yet another object is the provision of a ball valve seal retainer as described in the above objects which is simple and inexpensive to manufacture, and is readily incorporated within a valve, either initially or on replacement.

In the practice of the subject invention, an on-off ball valve having a single inlet and outlet includes a pair of generally annular seals, one at the inlet and the other at the outlet side, which engage the rotatable valve member for preventing fluid leakage therepast. A thin, annular retaining clip is edge anchored in a circumferential recess of the valve housing located immediately adjacent to or within each seal for exerting a retaining force on the seal. Emplacement of the retaining clips is accomplished by disposing them on the tapered end of a mandrel which forces the clip against the seal and causes the clip edges to be received within the corresponding recess.

DESCRIPTION OF A PREFERRED EMBODIMENT

Figure 1:
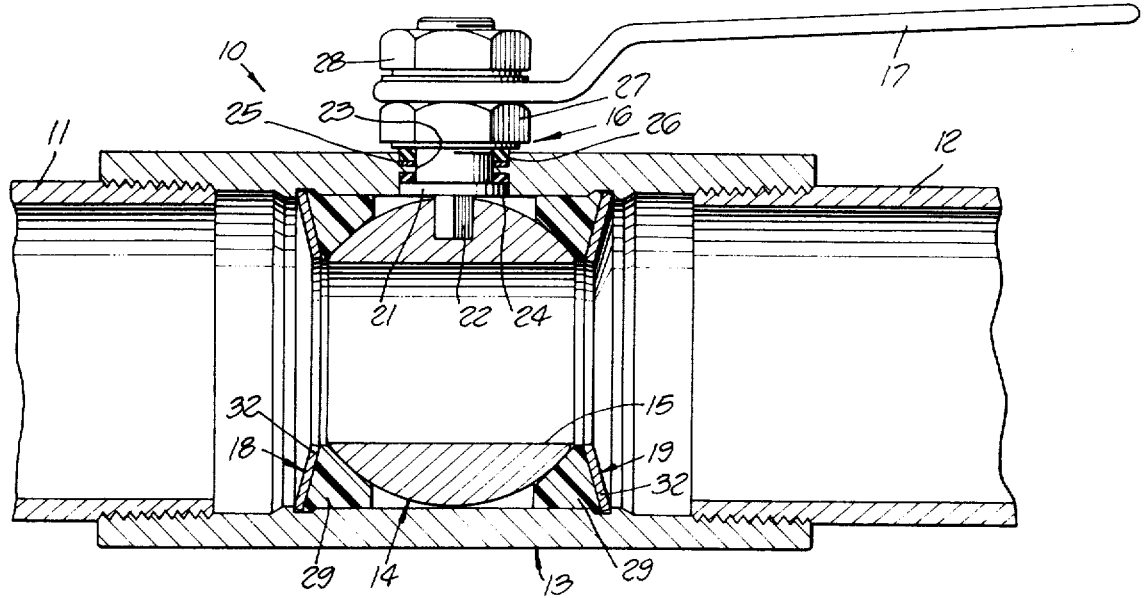
FIG. 1 is a longitudinal, sectional view of a ball valve installed in a pipeline and including the seal and retainer of the present invention.
Figure 2:
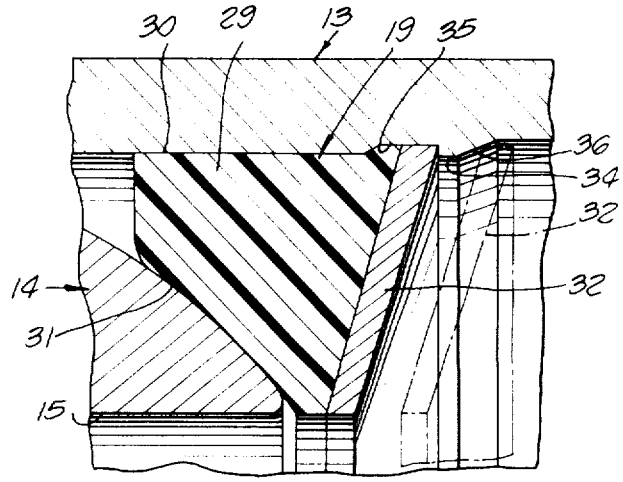
FIG. 2 is a greatly enlarged, sectional, elevational view of the valve seal and seal retainer.

With reference now to the drawing and particularly FIG. 1, the subject invention is incorporated within a ball valve 10 which is selectively actuable to control the passage of fluid through a pipe, two sections of which pipe are identified by the reference numerals 11 and 12. A hollow, cylindrical housing 13 has its open ends threaded for receiving the similarly threaded ends of pipe sections 12 and 13.

Centrally located within the housing 13 is a generally spherical valve member 14, having an opening 15 passing completely therethrough. Actuating means 16 fixedly secured to the valve member 14 enables optional positioning of the valve member by lever arm 17 from a passing (open) state, as depicted in FIG. 1, to a fluid obstructing (closed) state with the opening 15 at 90° to that shown. A pair of sealing means 18 and 19, to be particularly described later, are provided at the valve inlet and outlet, respectively, for preventing fluid flow past the valve member other than through the opening 15 when the valve is open.

The actuating means 16 includes a cylindrical stem 20, the upper end of which is threaded. The lower end of the stem 20 has an enlarged hub 21 and a rectangular boss 22 for being received into a similarly shaped opening in the valve member 14.

In assembly, the stem is received through an opening 23 in the housing 13, with a stem seal 24 interrelating the hub 21 and housing wall, a stem seal 25 and gland 26 received in that order onto the outwardly directed part of the stem and a first nut 27 threaded thereon. Next, the lever arm 17 is suitably connected to the stem and a final nut 28 secures the lever arm in place. Rotation of the stem 20 by the arm 17 serves to rotate the valve member 14, thereby actuating the valve in the known manner.

Each sealing means 18, 19 comprises a generally annular ball seal 29 having a smooth cylindrical periphery 30 and a tapered inner surface 31. The seal dimensions are such as to provide a continuous contacting relation between the periphery 30 and inner wall of housing 13 as well as between the tapered surface 31 and the ball member 14 outer surface. The seal bore is substantially the same or slightly larger than the ball opening 15.

A retainer 32 is located over each seal of the sealing means 18 and 19 to hold the seals in place against the valve ball member 14 and to exert a continuous pressure on the seals such that on wear occurring at the surface 31, for example, contacting relation is still maintained. Each retainer includes an annular body member constructed of relatively thin material and having a body band width $a$ substantially equal to the distance between the opening 15 edge and the inner wall of the housing 13. In the unseated condition, i.e., before insertion into the valve, the retainer may be generally flat or have its body or body band width canted slightly from the flat as illustrated.

Figure 3:
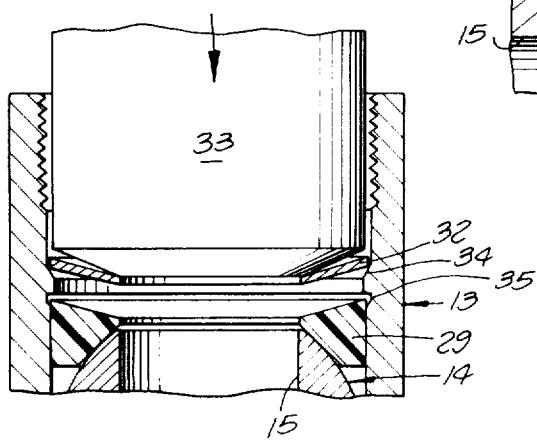
FIG. 3 is a longitudinal sectional view depicting installation of the seal retainer of this invention.

In assembly of the retainers and seals, each seal 29 is first inserted into place with its periphery 30 smoothly bearing against the inner wall of the housing 13 and the tapered surface 31 abutting conformingly against the ball member 14. Next, the retainer 32 is inserted through the open end of the housing to the position shown in FIG. 3 slightly spaced from the associated seal. A mandrel 33, having a tapered forward end generally conforming to the retainer geometry, is inserted through the housing opening to engage the retainer as depicted in FIG. 3 and move it in the direction of the arrow toward the seal. A ridge 34 on the inner housing surface engages the outer retainer edge, compressing it as it moves therepast. Immediately adjacent the ridge 34 is a continuous circumferentially extending recess 35 formed in the housing inner wall and into which the peripheral edge of the retainer is received. It is to be noted that the diameter of the recess is slightly less than the entrance diameter to the housing such that the retainer may be freely moved through the housing opening to a point just short of the ridge 34, after which further motion by the mandrel compresses the retainer and seats it in the recess. As an aid to initiating compression in the retainer, the inner wall of the housing outwardly of the ridge 34 is tapered as at 36 to provide a ramp along which the retainer periphery edges move.

As an alternate embodiment, the retainer 32 may be encased within the ball seal 29 or otherwise adhered to seal outer surface. Assembly would still be accomplished generally in the same manner as for the first described embodiment, except that the retainer and seal for each side of the valve member would be assembled as a unit.

Accordingly, in the practice of the present invention, sealing means are provided in which a retainer compressingly engages an annular seal holding it in fluid tight relation against the valve member and associated housing walls, maintaining sufficient pressure that normal seal wear will be automatically compensated for through the action of the retainer pressure.

Initial fabrication, and later removal, repair or replacement of the sealing means are thereby readily accomplished both simply and inexpensively.

It is to be noted, particularly in FIG. 3, that installation of the retainer and seal in accordance with this invention produces radial load on the seal 29 by the housing 13, insuring a leak tight relation between these surfaces. Moreover, the retainer provides an axially directed preloading which forces the retainer against the seal, and the seal against the valve member 14, thereby effecting low line pressure sealing.

As fluid line pressure is raised on either side of the valve member 14, the member is forced against the seal on the low pressure side loading both the seal and its retainer on that side. The so loaded retainer undergoes a cantilever deflection which forces the retainer periphery even more into the recess 35. Also, at this time, the associated seal on the low pressure side is forced along the retainer band surface against the housing inner wall surface, thereby increasing the sealing relation in those areas. In this same connection, the retainers are so constructed that under maximum line pressure load they will not take a permanent set which would obviously be detrimental to successful operation.

I claim:

1. Sealing assembly for a rotary ball valve, comprising:
   an annular seal having a first surface conformingly contacting the ball and a second surface facing oppositely thereto; and
   a resilient annular retainer having a peripheral edge and an inner edge, said retainer compressingly engaging the second surface of said seal and said retainer inner edge lying in a plane closer to the ball than the plane of said outer edge.

2. Sealing assembly for a rotary ball within a generally cylindrical housing, comprising:
   a ring seal having a first surface for contacting the ball, a second surface for bearing against the inner housing wall and a third surface generally opposite said first surface; and
   a resilient annular retainer received within said housing and compressingly engaging the third seal surface in such a direction as to provide a first force component on the seal in a direction toward the ball and a second force component on the seal toward the housing wall.

3. Sealing assembly as in claim 2, in which the retainer width dimension exceeds the housing inner dimension such that said retainer is placed in compression on installation against the seal.

4. Sealing assembly as in claim 2, in which the retainer is edge secured within the housing when bearing against the seal.

5. Sealing assembly as in claim 2, in which the retainer and seal are integrally related prior to installation and are assembled as a unit.

6. Ball valve apparatus, comprising:
   hollow cylindrical housing having a relatively constant bore and a pair of spaced recesses on the inner wall;
   a ball having an opening passing therethrough received within said housing and located between said recesses;
   means connected to said ball and extending outwardly of said housing for selectively rotating said ball; and
   first and second sealing means arranged at each side of the ball for preventing fluid flow past said ball except through the ball opening, each of said sealing means including
   an annular seal contacting the ball and housing inner wall, and
   a ringlike seal retainer received within said housing bore with the retainer edge lodged within the recess the dimensions of said retainer exceeding the internal housing bore dimensions whereby said retainer is placed in compression on being installed in said housing.

7. Ball valve apparatus as in claim 6, in which said retainer includes a thin annular bandlike body which in the unseated condition is flat and on being compressed during installation said bandlike body cants from the flat condition.

8. Ball valve apparatus as in claim 6, in which said retainer is encased within said seal.

9. Ball valve apparatus as in claim 6, in which the housing inner wall surface includes a projecting ridge lying outwardly of each recess.

* * * * *